April 13, 1965   H. J. NELSON   3,178,040
WORK HANDLING APPARATUS
Original Filed Jan. 13, 1961   3 Sheets-Sheet 3

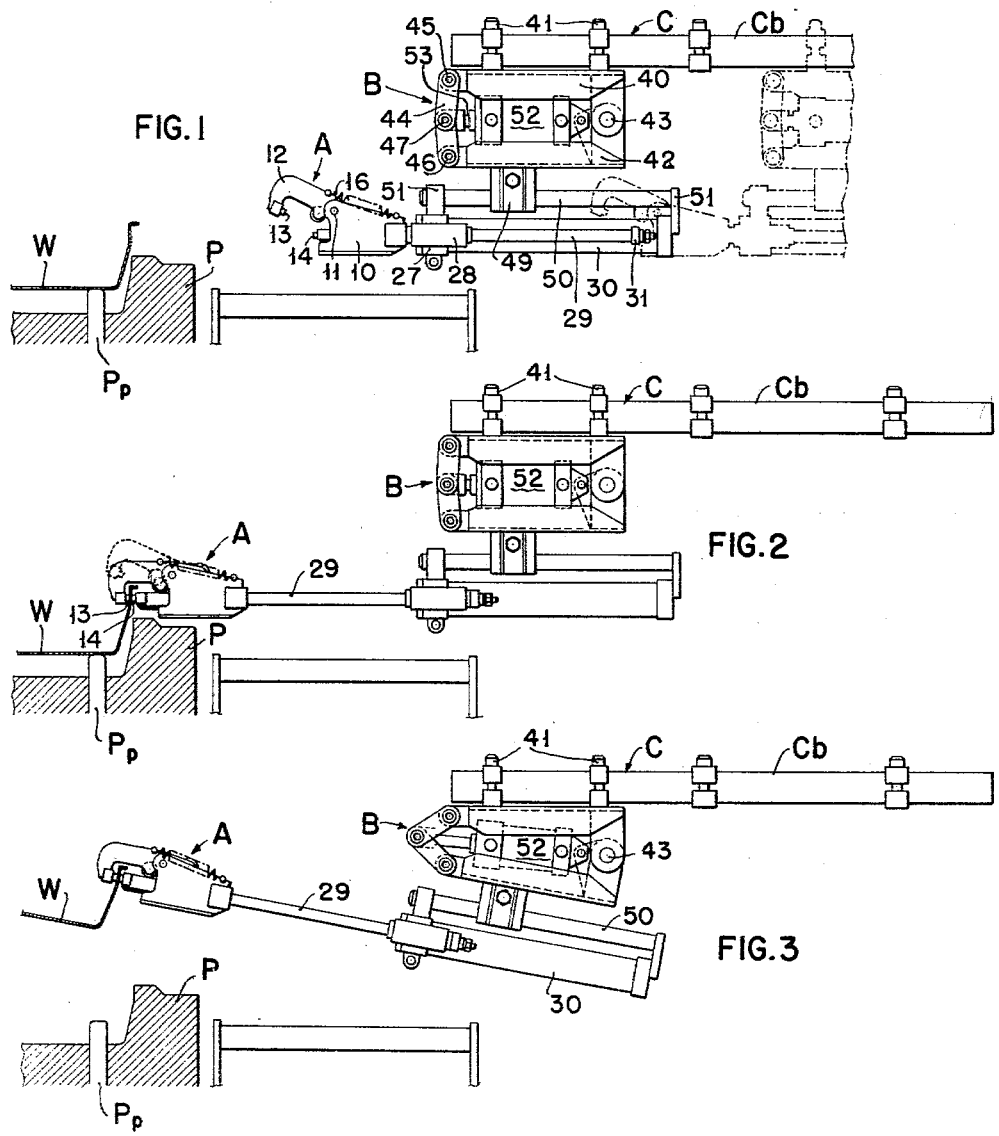

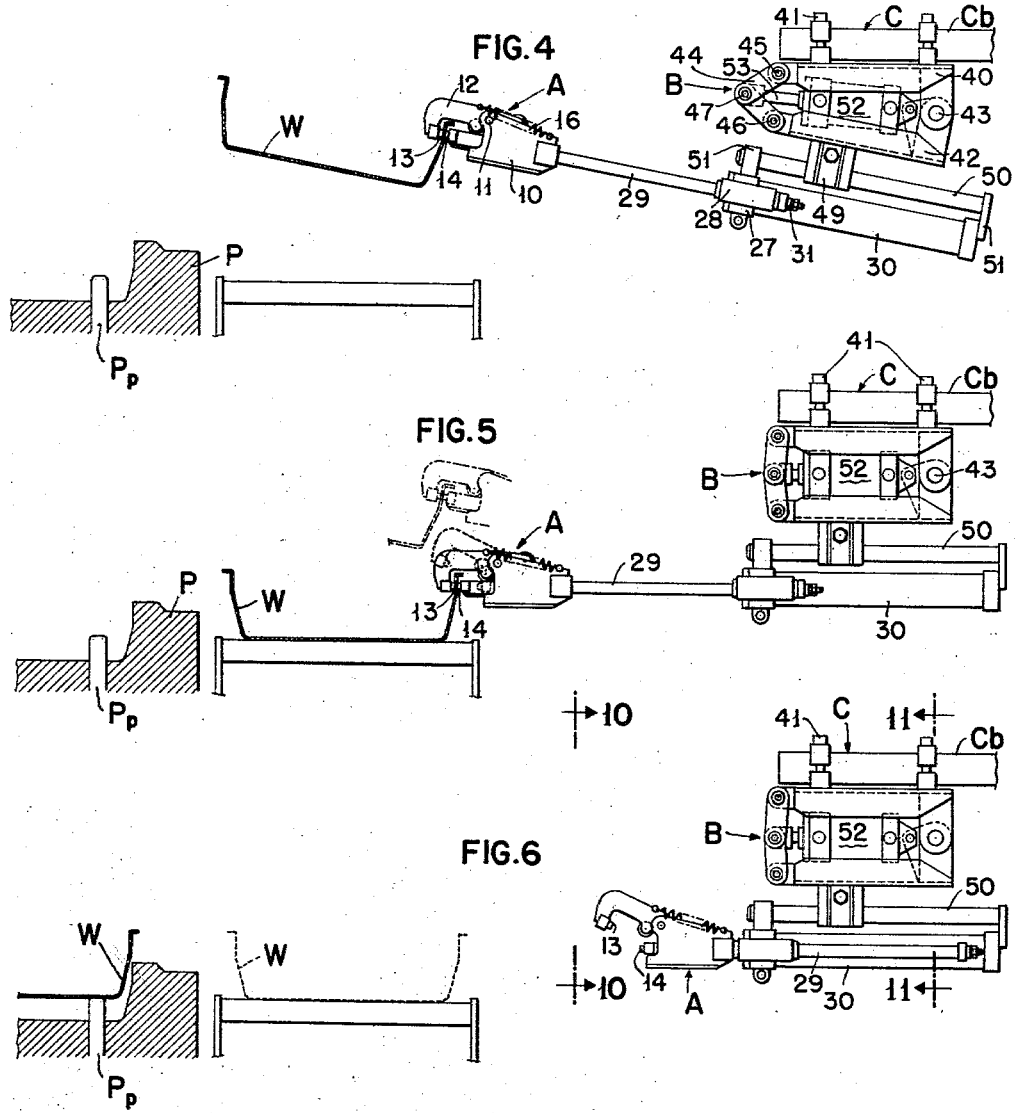

INVENTOR.
Harvey J. Nelson
BY
Wm. R. Glisson
ATTORNEY

United States Patent Office 3,178,040
Patented Apr. 13, 1965

3,178,040
WORK HANDLING APPARATUS
Harvey J. Nelson, Detroit, Mich., assignor to The Budd Company, Philadelphia, Pa., a corporation of Pennsylvania
Continuation of abandoned application Ser. No. 82,504, Jan. 13, 1961. This application Aug. 20, 1963, Ser. No. 303,393
4 Claims. (Cl. 214—1)

This application is a continuation of my copending application Serial No. 82,504 filed January 13, 1961, now abandoned, for "Work Handling Apparatus."

This invention relates to work handling apparatus, especially to gripper work translating apparatus, and has for an object the provision of improvements in this art.

To remove a deep drawn stamped object from a lower female die in a press the object is usually forced out of the female die by push pins in order to expose a vertical flange of the deep drawn object. Heretofore, the gripping devices of work handling apparatus would not grip the vertical flange in its exact exposed position but would move the object laterally during the gripping operation causing damage to the object to be removed from the dies. It is desirable to provide a gripping device which will grip the exposed vertical flange of the object without moving the vertical flange or the object being gripped and further permit substantially vertical movement of the object before lateral displacement of the object takes place. It is further desirable that the gripper device be operable within the restricted or narrow confines of deep drawing dies in a press.

One of the particular objects of the invention is to provide gripper apparatus which will grip an object in a definite fixed position after one of the gripper jaws has been translated to a fixed position relative to a portion, such as a flange, of the object or workpiece.

It is another object of the present invention to provide a gripper apparatus in which the clamping jaws move in opposite directions relative to each other so that the vertical flange of an object is gripped by the device without requiring movement of the vertical flange of the workpiece.

Another object is to provide an improved support guide for a gripper device which will strongly resist side twist.

Another object is to provide work handling apparatus which will move the workpiece substantially vertically while the gripper jaws are in a fixed position without lateral movement.

Another object is to provide improved actuating and support apparatus for moving the gripper device vertically.

Another object is to provide simple, inexpensive and reliable work handling apparatus of the type defined.

The above and other objects and advantages of the invention will be apparent from the following description, of an exemplary embodiment, reference being made to the accompanying drawings wherein:

FIG. 1 is a side elevation of the apparatus serving a press, the gripper being in a retracted position;

FIG. 2 is a view like FIG. 1 but showing the gripper jaws engaged with the flange of a workpiece;

FIG. 3 is a view like FIGS. 1 and 2 but showing the workpiece lifted out of the press die;

FIG. 4 is a view like FIGS. 1 to 3 but showing the gripper moved back with the workpiece;

FIG. 5 is a view like FIGS. 1 to 4 but showing the gripper swung down and the workpiece released;

FIG. 6 shows the gripper moved back further and the gripper jaws open;

Figure 7:
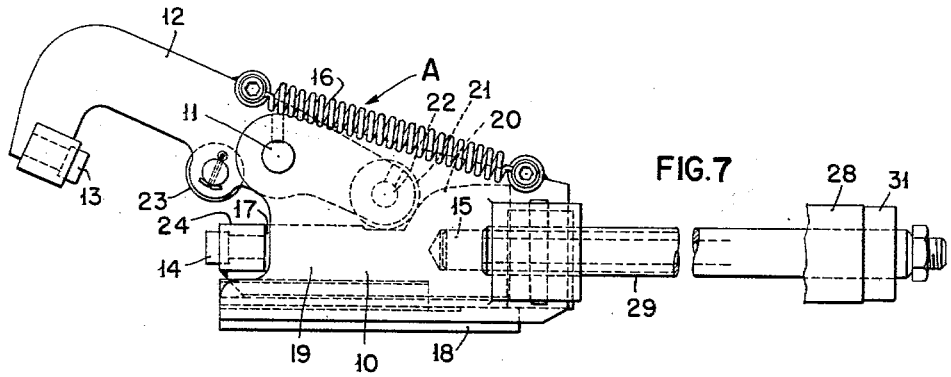
FIG. 7 is an enlarged side elevation of the gripper mechanism with the jaws open.

As shown in the drawings, a press P has a stamping or workpiece W to be served, this term including either feeding in or removal. The press has a deep cavity female die for a deep drawn workpiece, and while left pins Pp are provided for pushing up or lowering the workpiece, it is important that the serving or handling apparatus should be able to move the workpiece vertically from this stationary position without translatory lateral movement. There have been devices which move the workpiece vertically while the handling jaws have some translatory lateral movement; but such prior art devices do not extend to the field of utility where the workpiece must have a definite vertical movement of considerable extent between restrictive sidewalls.

The work handling apparatus includes a novel gripper device A which is carried by a novel lifter device B which, in turn, is carried by a translatory device C. The translatory device is of a known type which provides straight line movement over a considerable distance while the workpiece is held by the gripper device. Only the support beam or bar Cb of the translatory device is shown herein but it will be understood that it may be similar to that shown in the patent to Halberstadt No. 2,901,126 or an equivalent type.

The novel gripper device is A comprises a gripper head 10 carrying a pivot pin 11 on which a front jaw lever or pivot lever 12 is turnably mounted. The pivot lever is turned laterally at the front end and carries a jaw 13 which cooperates with a rear jaw 14 carried by a push rod 15 grip the vertical or substantially vertical flange Wf of the workpiece between them. One or more springs 16 normally hold the front jaw in open position.

The push rod or actuator rod 15 carries a slide lever 17 which is guided by a bottom plate 18 and side plates 19 of the gripper head; and when the rear jaw 14 is pushed forward a cam 20 comprising a flat translation portion and raised operating portion on the jaw slide lever 17 engages a cam follower 21, such as a roller mounted on a pin 22 here, carried by the jaw lever 12 swing the front jaw 13 down behind the flange Wf in line with the rear jaw 14 against the bias of spring 16. Lever 12 being mounted on pin 11 substantially above the lever 17 and jaw 14 is pivoted so as to move jaw 13 toward the rear face of flange Wf and toward jaw 14 on lever 17, thus, permitting the flange Wf to be gripped without the necessity of moving the workpiece. A guide roller 23 carried by the lever 12 engages a top surface 24 of the slide to hold both jaws in aligned position.

In addition to the head assembly 10 just described, the gripper device includes a base support 27 provided with long guides 28 on each side which slidably carry parallel support rods 29 to the front end of which the head 10 is secured. These paired rods assure that the operating piston and gripping jaws are on the same plane with the guide rods thereby eliminating excessive wear and undue strain on the mechanism and also provide very strong resistance to side twisting, which is very important when large stampings are handled.

The push rod 15 is operated by a power device 30, here represented by a fluid motor cylinder carried by the base 27, the rod 15 being the piston rod of a piston operating in the cylinder. The support rods 29 at the rear end carry resilient stops 31 for engaging the rear end of the guides 28 when fully forward; and one of them carries an actuator for controlling a timing limit switch when in the rearward position.

The lifter device B comprises a frame 40 which is adjustably secured to the bar or beam Cb of the translatory device, as by clamps 41. A lower frame 42 is pivoted to one end of the upper frame 40 by a pivot pin 43 and at the other end is swingably connected to the upper frame by a toggle linkage 44 having upper and lower pivot pins 45, 46 and a middle pivot pin 47. The lower frame 42 carries a clamp 49 for adjustably securing the bar 50 carried by brackets 51 of the base 27 to the lower frame 42 of the lifter device.

An independent power device is provided for operating the toggle linkage to swing the gripper frame up and down, the power means here shown comprising a fluid cylinder 52 pivoted to the pin 43 and a piston having a rod 53 connected to the middle pivot pin 47 of the toggle linkage.

In operation, the translatory device C will move the gripper A and the lifter device B secured thereto toward the open press, positioning the gripper device with open jaws opposite the workpiece to be removed from the press. The workpiece W has been raised by lift pins Pp to provide an exposed vertical flange as shown in FIGS. 1 to 3. The gripper device is extended laterally by power device 30 acting through actuator rod 15 until the lateral movement of head 10 is limited by silent stops 31 on support rods 29 engaging the rear of guides 28. Continued lateral movement of the actuator rod 15 of power device 30 causes the open jaws to close one upon the other at a predetermined lateral gripping position firmly gripping the vertical flange of the workpiece without moving the workpiece.

While the gripper device is not moving and after the jaws have gripped the workpiece, the power device 52, 53 of the lifter B is operated to collapse the toggle 44 and lift the gripper head with the workpiece substantially vertically. The positions are shown in FIGS. 1 to 3.

With the workpiece still gripped and lifted clear of the press, the translatory device C is operated to take the workpiece away from the press, FIG. 4. The gripper is lowered with the jaws closed to drop the workpiece on a support, FIG. 5; the gripper jaws are then opened and the head drawn back by the power device 30 after this action, FIG. 6.

If a workpiece is to be fed in to the press instead of being withdrawn, the same mechanism can be used. The gripper will move forward and grip a workpiece; then lift it; then the translatory device will feed the workpiece forward to a position above the press die; the lifter will operate to lower the workpiece into the die; then the jaws will release; and all parts will be returned to initial position.

The novel gripping device, shown in detail in FIGS. 7 to 11, operates so that jaws 13 and 14 move laterally toward each other during a gripping operation and move laterally away from each other during a releasing operation thus permitting the extending vertical flange Wf of the workpiece W to be gripped at an exact position without moving the workpiece.

Figure 8:
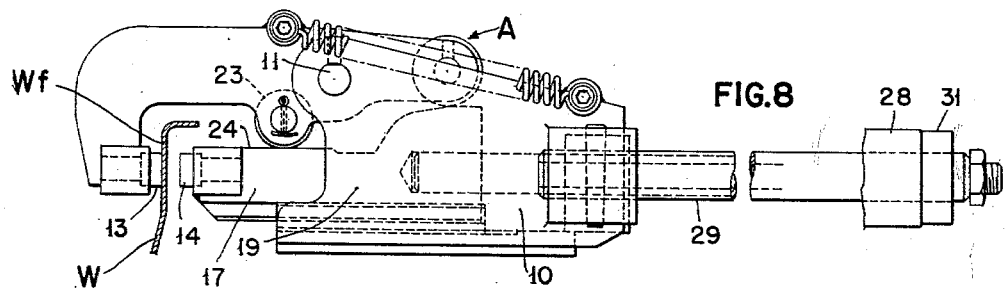
FIG. 8 is a view like FIG. 7 but showing the hinged jaw in closed position behind the flange of a workpiece.
Figure 9:
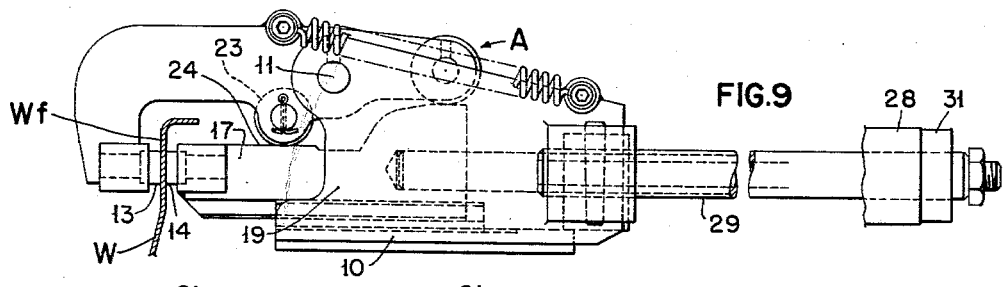
FIG. 9 is a view like FIGS. 7 and 8 but showing both jaws closed on the workpiece flange.
Figure 10:
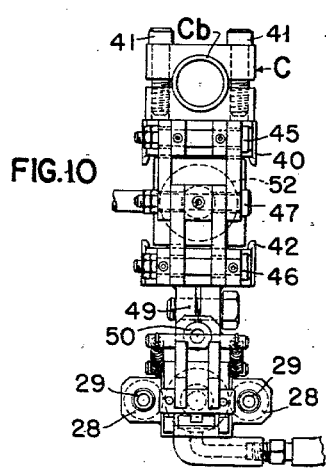
FIG. 10 is an enlarged end elevation taken on the line 10—10 of FIG. 6.
Figure 11:
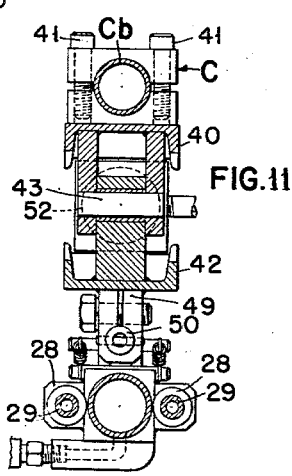
FIG. 11 is an enlarged transverse vertical section taken on the line 11—11 of FIG. 6.

In FIG. 1 the gripper device A is retracted relative to the base support 27 and levers 12 and 17 carrying jaws 13 and 14 are in the open position. Power device 30 acting through actuator rod 15 forces lever 17 laterally. The force on cam 20 is transferred through roller 21 and pin 11 to translate head 10 and its supporting rods 29 laterally therewith until the gripper device A is positioned with its jaws on either side of vertical flange Wf as shown in FIG. 7. Spring 16 is sufficiently strong to maintain the levers 12 and 17 in the open or translation position and prevent relative movement of the levers during translation. When the stops 31 on support rods 29 engage guides 28 of the base support 27 the lateral movement of head 10 and lever 12 pinned thereon is halted; however, actuator rod 15 attached to lever 17 is free to continue lateral movement. The continued movement of lever 17 moves the cam 20 under roller 21 causing lever 12 to pivot behind and approach the rear surface of flange Wf and assume a fixed position relative thereto as shown in FIG. 8. As lever 17 continues to move laterally, jaw 14 closes upon jaw 13 with the vertical flange gripped therebetween as shown in FIG. 9. Thus it is seen that the vertical flange of a workpiece is gripped without moving the workpiece.

After the workpiece is lifted, removed from the press and lowered to a support, as shown in FIG. 5, the gripper device A may again be actuated to release the workpiece. The gripper device is at this point still in the position shown in FIG. 9 with stops 31 adjacent guides 28. The initial lateral leftward force on lever 17 exerted by actuator rod 15 and power device 30 is sufficient to cause lever 17 to move relative to head 10 to a position like that shown in FIG. 8. At this point the roller 21 is on the inclined or raised gripping portion of cam 20 and springs 16 are sufficiently strong to cause levers 12 and 17 to open to a position like that shown in FIG. 7 before the gripping device A is returned laterally to its retracted position as shown in FIG. 1. Thus, it is seen that the novel device may be employed for loading or unloading a workpiece from a press by a reverse sequence of operations, and the jaws 13 and 14 move laterally away from each other without movement of/or damage to the workpiece or its flange.

The fluid power devices 30 and 52 preferably use air as the operating fluid.

Although one limit switch has been mentioned, it is believed to be unnecessary to illustrate a complete control system, that being obvious to a mechanic skilled in the art from the above disclosure.

It is thus seen that the invention provides effective yet simple to set up and inexpensive positive action apparatus for handling workpieces in predetermined vertical and horizontal paths.

While one embodiment of the invention has been described for purposes of illustration it is to be understood that there may be various embodiments and modifications within the general scope of the invention.

What is claimed is:

1. Work handling apparatus for gripping the vertical flange of a workpiece to be moved comprising,
   a base support,
   guides in said base support,
   support rods slidably fitted in said guides,
   stop means on the inner end of said support rods engageable with said base support to limit outward movement of said support rods relative to the base support,
   a gripper head mounted on the outer ends of said support rods for movement therewith,
   an actuation rod,
   a slide lever connected to the end of said actuation rod for movement therewith, said slide lever being slidably mounted in said gripper head for horizontal movement relative thereto,
   a cam on the end of said slide lever at the end adjacent said actuation rod, said cam having a gripper release cam face portion and a raised gripping cam face portion,
   a gripper jaw on the other end of said slide lever,
   a pivot lever mounted on said gripper head,
   a cam follower on one end of said pivot lever in cooperable engagement with said cam on said slide lever,
   a gripper jaw on the other end of said pivot lever,
   spring means on said pivot lever urging said cam follower on said pivot lever into engagement with said gripper release cam face portion of said cam on said slide lever to yieldingly hold the jaws of said levers in a normally open position,
   and a power cylinder mounted on said base support for moving said actuation rod laterally outward to effect lateral movement of said support rods and said gripper head together with said levers and their jaws in their normally open position until the stop means on said support rods engage the base support halting lateral movement of said support rods, said gripper head and said pivot lever, and subsequent continued outward lateral movement of said actuation rod and said slide lever engaging said raised gripping cam face portion with said cam follower closing said normally open jaws against the urging of said spring means to hold them open thereby closing said jaws at a predetermined lateral position by movement of both jaws horizontally toward the vertical flange to grasp the flange of a workpiece without moving the flange.

2. Work handling apparatus for grasping a vertical flange of an article comprising,
a base frame,
guides in said base frame,
support rods slidably fitted in said guides in said base frame, said support rods having outer and inner ends,
an actuating cylinder carried by said base frame,
a gripper head supported by and mounted on the outer end of said support rods for longitudinal movement therewith,
stops on the inner end of said support rods for limiting said longitudinal movement of said support rods and said gripper head,
a slide lever mounted for sliding longitudinal movement in said gripper head, said slide lever having an outer and an inner end,
a pivot lever mounted for pivotal movement on a pivot pin above said slide lever on said gripper head, said lever having an outer and an inner end,
a first gripper jaw on the outer end of said pivot lever,
a cam follower on the inner end of said pivot lever,
a second gripper jaw on the outer end of said slide lever,
a cam on the inner end of said slide lever, said cam having a raised portion cooperable with said cam follower to pivot said pivot lever to a closed position, said cam follower being normally out of engagement with said raised portion of said cam with said pivot lever in a normal open position,
springs on said pivot lever urging said pivot lever to the normally open position,
and an actuation rod translatable longitudinally outward by said actuating cylinder, said actuation rod being connected to said slide lever for translating said gripper head, said levers and said support rods longitudinally when said pivot lever is in the normally open position until said stops on said inner end of said support rods halt the outward longitudinal movement of said gripper head, and continued outward movement of said slide lever by said actuation rod engages said cam follower on said raised portion of said cam to pivot the jaw of said pivot lever to a closed position over and behind a vertical flange of an article as said jaw on said slide lever closes upon the jaw on the pivot lever to grasp the vertical flange of the article without changing the position of the flange.

3. Work handling apparatus for gripping an upright extending flange of a workpiece comprising,
a gripper head mounted for lateral movement on support rods,
a slide lever mounted in guides in said gripper head laterally movable relative thereto,
a first gripper jaw on one end of said slide lever, said gripper jaw having a face parallel to the upright extending flange of the workpiece to be grasped,
a raised cam on the other end of said slide lever,
a pivot pin fixed on said gripper head above the plane of lateral movement of said first gripper jaw on said slide lever,
a pivot lever mounted on said pivot pin intermediate its ends,
a second gripper jaw on one end of said pivot lever,
a cam follower on the other end of said pivot lever cooperable with said cam on said slide lever to pivot said pivot lever,
spring means urging said cam follower into engagement with said cam on said slide lever, said cam being shaped so that said spring means normally maintain said levers in an open position,
stop means on said support rods for limiting the lateral movement of said gripper head when it is extended to a gripping position opposite an upright extended flange of a workpiece,
an actuation means for moving said slide lever laterally relative to said gripper head and effecting a cam action of said cam follower on said raised cam to pivot said pivot lever over the upright extended flange of said workpiece to a position abutting the rear surface of said flange and simultaneously closing said slide lever upon the front face of said flange to grasp said flange between said jaws of said levers.

4. A gripping device for grasping both faces of a vertical flange of a workpiece without imparting lateral movement to the vertical flange,
a gripper head positionable opposite a vertical flange of a workpiece,
a slide lever mounted for horizontal sliding movement in said gripper head,
a gripper jaw on the front end of said slide lever positioned opposite the front face of said vertical flange,
a cam on the other end of said slide lever having lower and raised faces,
a pivot lever mounted on a pivot pin in said gripper head above said slide lever,
a cam follower on one end of said pivot lever normally urged in continuous contact with said lower face of said cam on said slide lever,
a gripper jaw on the other end of said pivot lever normally located above the gripper jaw on the slide lever and normally located above and behind the rear face of the vertical flange of the workpiece, said gripper jaw on said pivot lever being located in axial alignment with said gripper jaw on said slide lever when said cam follower is in contact with the raised face of said cam,
and an actuation rod attached to said slide lever adjacent the raised cam for sliding said slide lever horizontally relative to said gripper head and camming said cam follower onto said raised face of said cam pivoting the gripper jaw on said pivot lever from above and behind said vertical flange to a position touching the rear face of said vertical flange and in axial alignment with said gripper jaw on said slide lever to provide grasping action of said jaws on a vertical flange without imparting lateral movement to said vertical flange.

References Cited by the Examiner
UNITED STATES PATENTS

| | | | |
|---|---|---|---|
| 551,831 | 12/95 | Morgan | 214—27 X |
| 1,635,622 | 7/27 | Henderson | 294—116 X |
| 2,562,035 | 7/51 | Hileman. | |
| 2,677,342 | 5/54 | Miller. | |
| 2,699,697 | 1/55 | Kelso. | |
| 2,763,229 | 9/56 | Sahlin. | |
| 2,786,580 | 3/57 | Balogh | 214—130 X |
| 2,901,126 | 8/59 | Halberstadt. | |
| 2,910,321 | 10/59 | Sehn. | |

FOREIGN PATENTS 161,653    4/21    Great Britain.

HUGO O. SCHULZ, *Primary Examiner.*

MORRIS TEMIN, *Examiner.*